United States Patent
Adachi

(10) Patent No.: US 7,293,624 B2
(45) Date of Patent: Nov. 13, 2007

(54) FLIP-UP TYPE HOOD FOR VEHICLE

(75) Inventor: Yasunori Adachi, Isehara (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 295 days.

(21) Appl. No.: 11/032,022

(22) Filed: Jan. 11, 2005

(65) Prior Publication Data

US 2005/0179286 A1 Aug. 18, 2005

(30) Foreign Application Priority Data

Feb. 13, 2004 (JP) .......................... P 2004-037030

(51) Int. Cl.
*B60R 21/34* (2006.01)
(52) U.S. Cl. ..................................... 180/274
(58) Field of Classification Search ............... 180/271, 180/274, 281; 296/193.11; B62D 25/12; B60R 21/34
See application file for complete search history.

(56) References Cited

U.S. PATENT DOCUMENTS

| | | | |
|---|---|---|---|
| 6,182,782 B1 * | 2/2001 | Matsuura et al. ........... 180/274 |
| 6,217,108 B1 | 4/2001 | Sasaki | |
| 6,293,362 B1 * | 9/2001 | Sasaki et al. ............... 180/274 |
| 6,364,402 B1 * | 4/2002 | Sasaki ................... 296/187.09 |
| 6,415,882 B1 * | 7/2002 | Schuster et al. ......... 180/69.21 |
| 6,439,330 B1 * | 8/2002 | Paye ....................... 180/69.21 |
| 6,513,617 B2 * | 2/2003 | Sasaki et al. ............... 180/274 |
| 6,520,276 B2 * | 2/2003 | Sasaki et al. ............... 180/274 |
| 6,530,449 B2 * | 3/2003 | Sasaki et al. ............... 180/274 |
| 6,554,093 B2 * | 4/2003 | Sasaki et al. ............... 180/274 |
| 6,609,583 B2 * | 8/2003 | Schillaci et al. ......... 180/69.21 |
| 6,645,679 B1 * | 11/2003 | La Fontaine et al. ........... 430/5 |
| 6,802,556 B2 * | 10/2004 | Mattsson et al. ....... 296/187.09 |
| 2006/0032693 A1 * | 2/2006 | Parks et al. ................. 180/271 |

FOREIGN PATENT DOCUMENTS

| | | |
|---|---|---|
| DE | 40 19 121 A1 | 1/1991 |
| DE | 102005016324 A1 * | 10/2006 |
| EP | 0 967 128 A2 | 12/1999 |
| GB | 2394922 A * | 5/2004 |

(Continued)

*Primary Examiner*—Paul N. Dickson
*Assistant Examiner*—Drew J. Brown
(74) *Attorney, Agent, or Firm*—McDermott Will & Emery LLP

(57) ABSTRACT

A flip-up type hood for a vehicle, includes a vehicle body forming the vehicle, a hood body pivotally supported by the vehicle body through a pair of hood hinges attached to a rear end of hood body, and actuators provided in the vehicle body to apply a flip-up forces on rear portions of the hood body 10 and wires for connecting a designated part of the hood body with the vehicle body. In the hood, a length of each wire is established so as to allow the wire to be strained on condition that the hood body is flipped up. In operation, the strained wires operate so as to constrain the hood body to the side of the vehicle body, it is possible to suppress the rear portion of the hood body from being flipped up excessively and also possible to prevent an occurrence of flip-flop action of the hood body when the rear portions of the hood body is raised by the actuators.

8 Claims, 7 Drawing Sheets

FOREIGN PATENT DOCUMENTS

| | | |
|---|---|---|
| JP | 10-119823 | 5/1998 |
| JP | 10-119824 | 5/1998 |
| JP | 10-258774 | 9/1998 |
| JP | 11-34925 | 2/1999 |
| JP | 11263191 A * | 9/1999 |

* cited by examiner

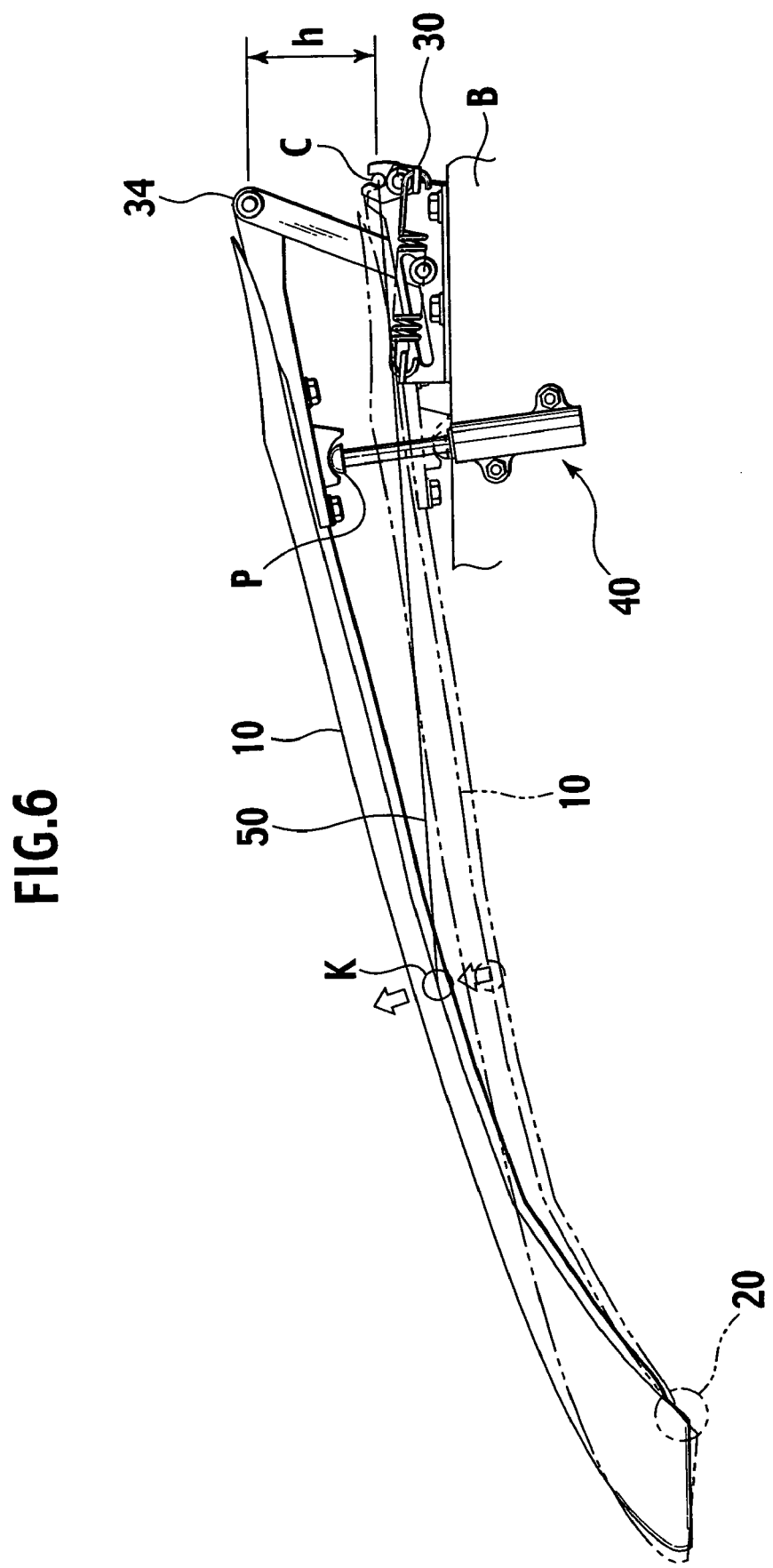

FLIP-UP TYPE HOOD FOR VEHICLE

BACKGROUND OF THE INVENTION

The present invention relates to a flip-up type hood whose rear end is tipped up when a traveling vehicle collides with an object, in view of enhancing absorbing efficiency of an impact of the object collapsing onto the hood.

The flip-up type hood of this kind is applicable to a hood for covering the upside of an engine room on the front side of a vehicle. This hood has its rear end connected to a vehicle body through a hood hinge and the front end engaged with the vehicle body through a hood lock. Normally, unlocking of the hood lock allows the hood to be opened. Then, the front end of the hood is moved upwardly about the hood hinge as a fulcrum.

When a vehicle comes into collision, at it front side, with an object, for example, a pedestrian, a flip-up force is applied on the rear end of the hood by an actuator. Consequently, the hood hinge's restriction to the rear end of the hood is cancelled, so that the hood is flipped up about the front end as a fulcrum. Such a mechanism is disclosed in Japanese Patent Application Laid-open (Hei) No. 10-119823 (page 5, FIG. 2).

Thus, this displacement of the rear end of the hood allows an interval between the hood and an engine to be increased, so that a displacement of the hood can be increased when the object interferes with the hood at a great acceleration, increasing absorption of impact energy. In this way, the disclosed mechanism is capable of suppressing damage on the object to the minimum.

In the earlier flip-up hood, it is necessary to complete the flip-up operation of the hood until an object on the collision interferes with the hood, requiring performance of the mechanism in a predetermined short time. In this view, the mechanism is configured so as to have an ability of exerting a great "flip-up" force on the hood in an instant.

Due to inertial mass of the hood itself, however, the mechanism's flip-up operation with a great "flip-up" force causes the hood to be flipped up excessively (so-called "overstroke" phenomenon). As a result, a fluttering motion of the hood is produced to reduce absorbing efficiency of impact energy on the object.

SUMMARY OF THE INVENTION

In the above-mentioned situation, it is an object of the present invention to provide a flip-up type hood that can prevent such an overstroke phenomenon with its simple structure and can suppress the fluttering motion of the hood when it is flipped up.

In order to attain the above object, according to the first aspect of the invention, a flip-up type hood for a vehicle, comprises: a vehicle body forming the vehicle; a hood body pivotally supported by the vehicle body through a hood hinge that is attached to a rear end of hood body in a fore-and-aft direction of the vehicle; an actuator provided in the vehicle body to apply a flip-up force on a rear portion of the hood body thereby flipping up the rear portion of the hood body apart from the vehicle body; and a wire for connecting a designated part of the hood body with the vehicle body, wherein a length of the wire is established so as to allow the wire to be strained on condition that the hood body is flipped up.

With the constitution of the above flip-up type hood, when the hood body is flipped up by the actuator, the wire is strained on the back side of the hood body to constrain it to the side of the vehicle body. Therefore, it is possible to suppress the rear portion of the hood body from being flipped up excessively. Owing to the simple provision of the wire between the hood body and the vehicle body, it is possible to prevent an occurrence of flip-flop action of the hood body when its rear portion is raised by the actuator. Thus, it is possible to accomplish the hood body in its stationary state at the stage of completing the designated "flip-up" operation. It means that there can be ensured a sufficient space defined between the hood body and rigid members (e.g. engine) under the hood body. In this way, it is possible to absorb impact energy on the object by the hood body effectively.

BRIEF DESCRIPTION OF THE DRAWINGS

FIG. 6 is a side view of the hood of the embodiment, showing its flip-up state;

DETAILED DESCRIPTION OF THE PREFERRED EMBODIMENT

Now referring to the accompanying drawings, an embodiment of the present invention will be described below.

FIGS. 1 to 8 show a flip-up type hood in accordance with one embodiment of the present invention.

Figure 1:
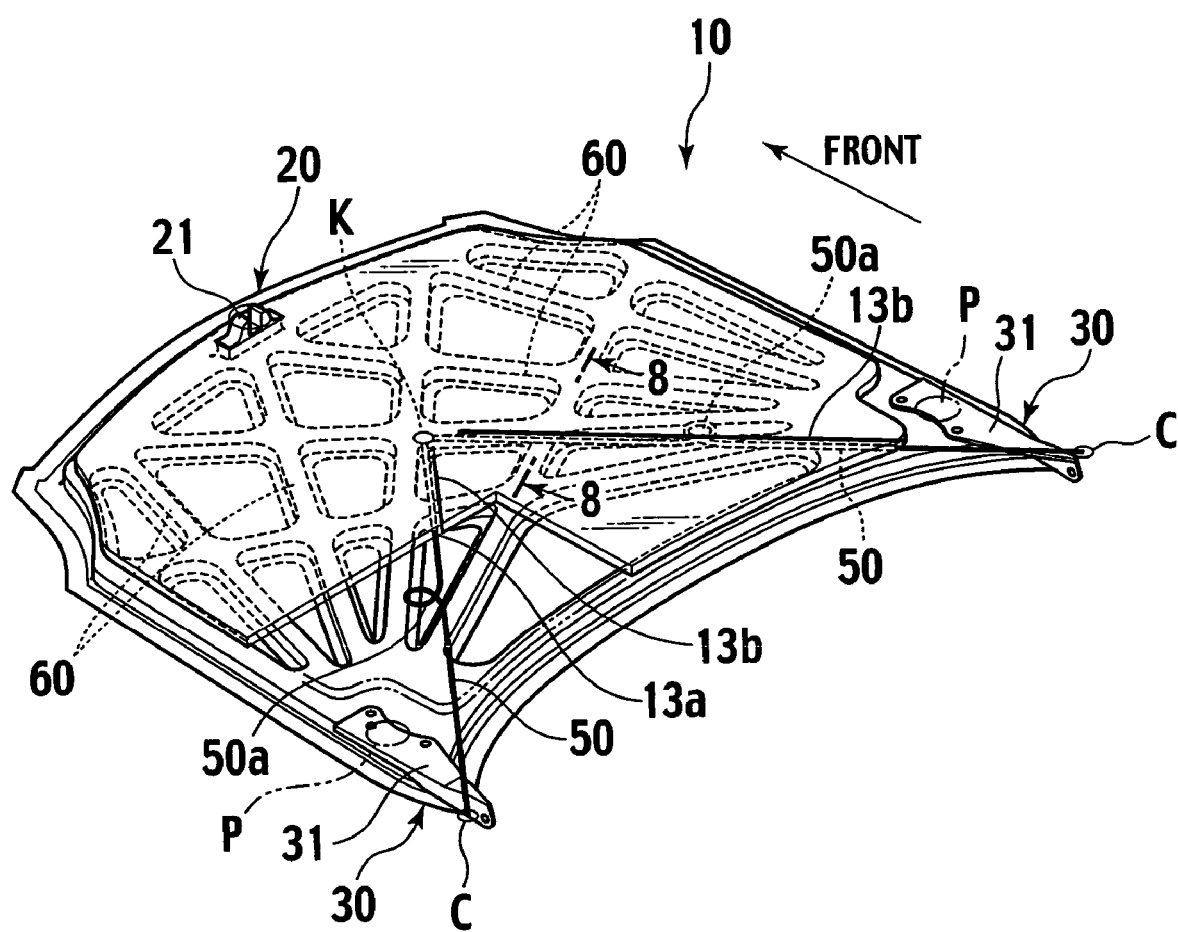
FIG. 1 is a perspective view of the backside of a hood in accordance with an embodiment of the present invention.
Figure 2:
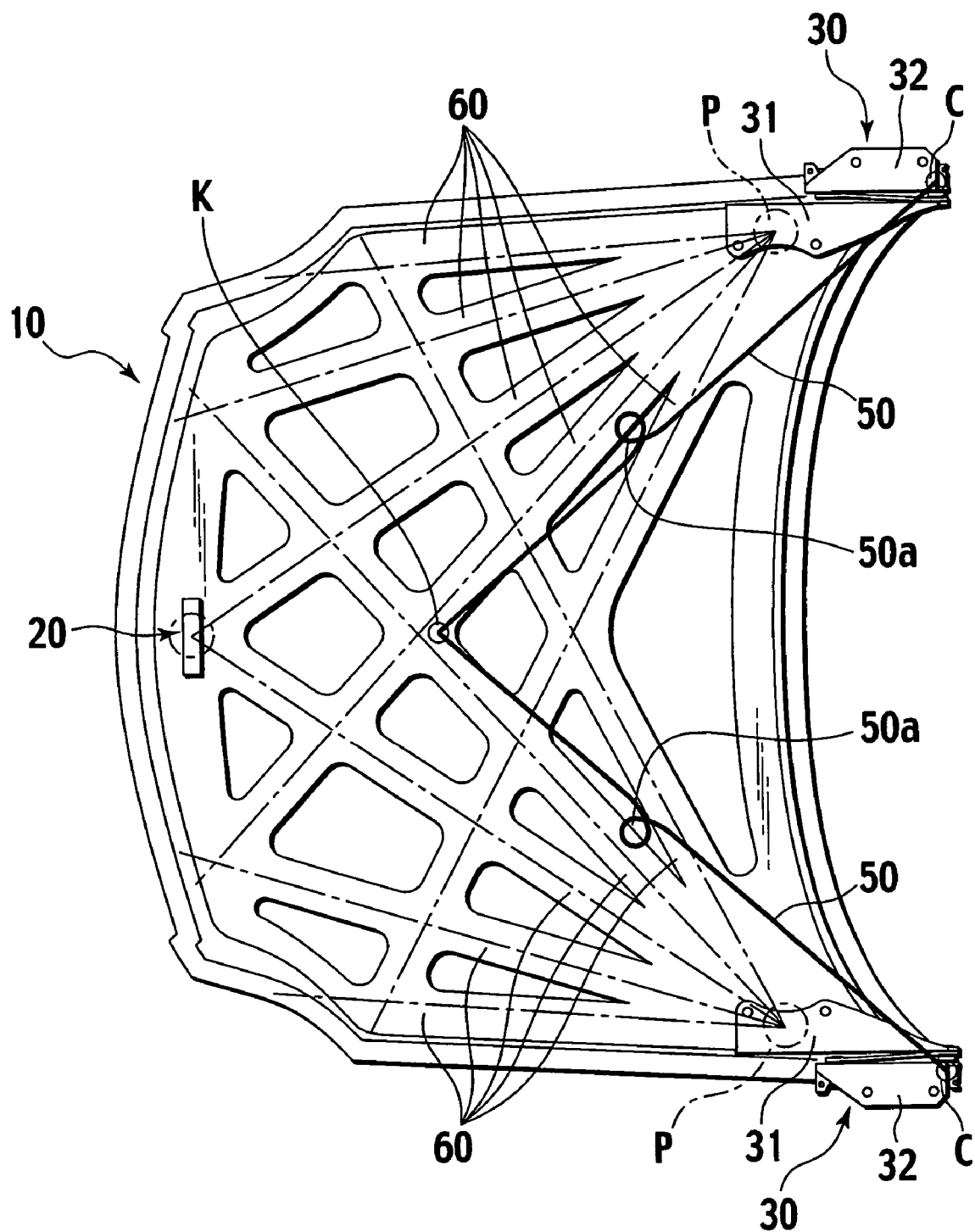
FIG. 2 is a bottom view of the hood in accordance with the embodiment of the present invention.

In FIGS. 1 and 2, a flip-up type hood body 10 of the shown embodiment is arranged on an upper opening of a front compartment of a vehicle body and also adapted so as to cover a power unit, such as an engine, of the vehicle.

The hood body 10 is provided, at the center of a front part, with a hood lock 20. On both sides of a rear end of the hood body 10, a pair of hood hinges 30 are arranged so as to allow the hood body 10 to be rotated to and apart from the vehicle body.

As shown in FIG. 1, the hood lock 20 includes an engagement tag 21 attached to the hood body 10 and a locking mechanism (not shown) provided in the vehicle body. The unlocking between the engagement tag 21 and the locking mechanism can be accomplished by a passenger's unlatching (i.e. operation in the vehicle cabin) the locking mechanism through a wire (not shown) and subsequently disengaging the tag 21 from the locking mechanism through a lever (not shown).

Figure 3:
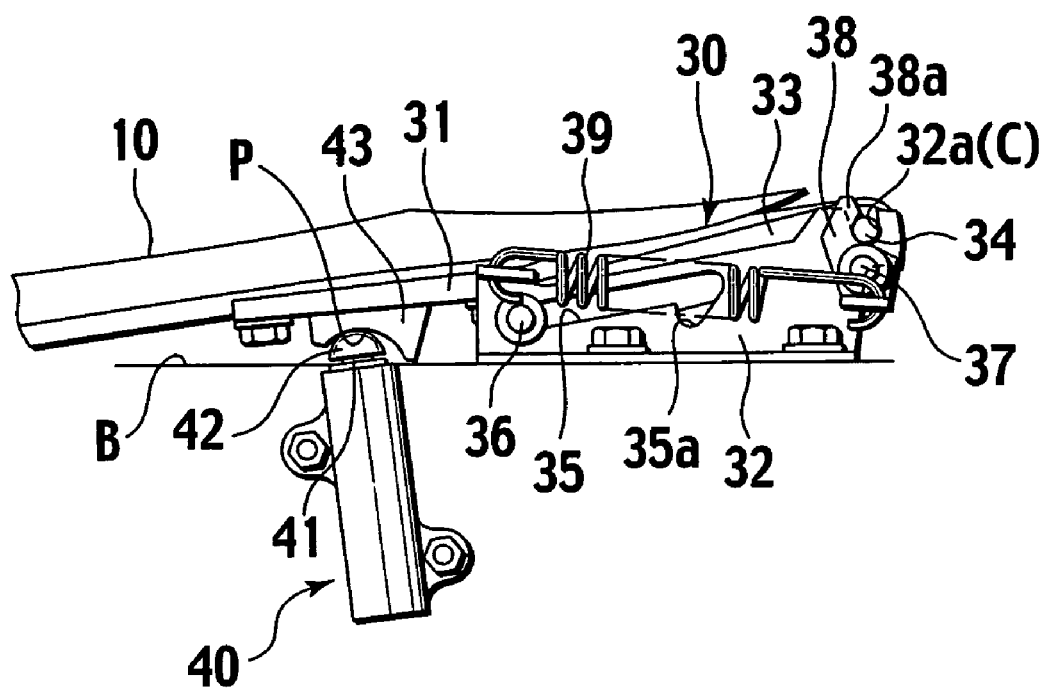
FIG. 3 is an enlarged side view of a hood hinge of the hood in accordance with the embodiment of the present invention.
Figure 4:
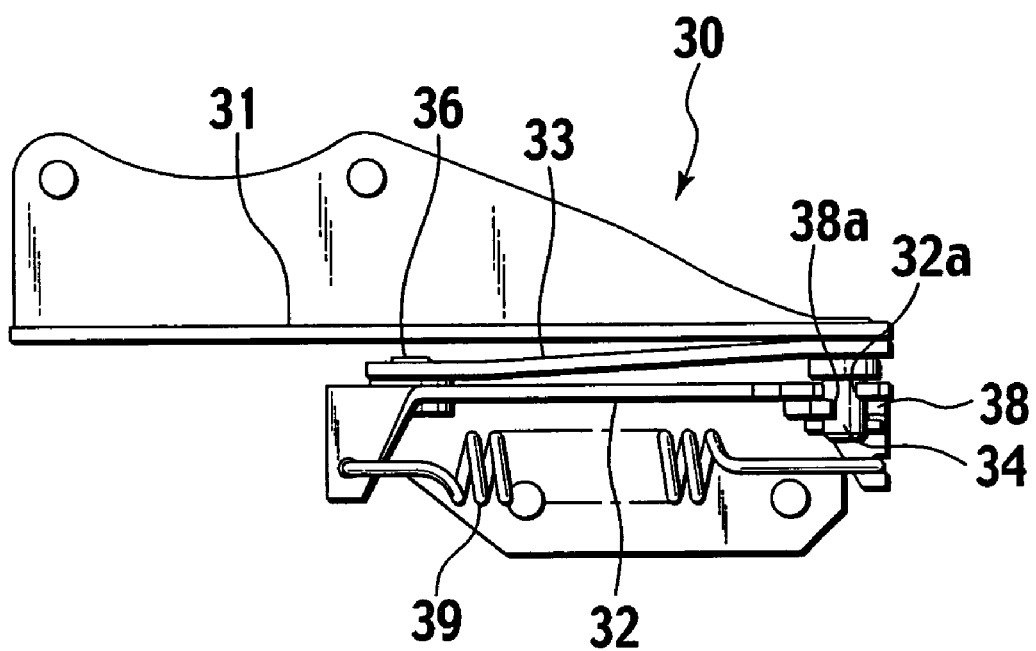
FIG. 4 is an enlarged plan view of a hood hinge of the hood in accordance with the embodiment of the present invention.

As shown in FIGS. 3 and 4, the hood hinge 30 includes a hood-side link member 31 coupled to the lower surface of the hood body 10, a body-side link member 32 coupled to the vehicle body B and an intermediate link member 33 arranged between the hood-side link member 31 and the body-side link member 32. The rear end of the hood-side link member 31 is rotatably connected with the rear end of the intermediate link member 33 through a pivot pin 34.

The body-side link member 32 is provided, at a rear end thereof, with a recessed and U-shaped engaging part 32a that can be disengageably engaged with an extension part of the pivot pin 34. Additionally, the body-side link member 32 has a slide hole 35 formed to extend from the front end of the link 32 to the intermediate portion. The slide hole 35 is provided, at a rear end thereof, with a recessed retainer part 35a. While, a guide pin 36 is fixed on the front end of the intermediate link member 33. The guide pin 36 is slidably engaged in the slide hole 35.

Under condition that the pivot pin 34 is engaged with the engaging part 32, the hood body 10 is opened or closed with a center focus on the pivot pin 34. It is noted that the engaging part 32a coincides with a hinge center C in this embodiment.

Below the engaging part 32a, a lock piece 38 is rotatably connected with the body-side link member 32 through a connecting pin 37. At the top of the lock piece 38, a lock claw 38a is formed so as to open or close a notched portion of the engaging part 32a with rotation of the lock piece 38. Due to tensile force of a spring 39 between the lower part of the lock piece 38 and the front end of the body-side link member 32, the lock claw 38a is urged in a direction to close the engaging part 32a (i.e. clockwise direction in FIG. 3).

On the side of the vehicle body B corresponding to the front end of the hood-side link member 31, an actuator 40 is provided to apply a flip-up force on the hood body 10. In the actuator 40, a push rod 41 is arranged to project upwardly when a vehicle collision is detected. On the underside of the front end of the hood-side link member 31, a receiving piece 43 is arranged to receive a tip 42 of the push rod 41. It is noted that the receiving piece 43 forms a working point P of the flip-up force.

The actuator 40 is configured so as to make the push rod 41 project in a moment of time with an enough force for lifting up the hood 41 when detecting a vehicle collision.

Figure 5A:
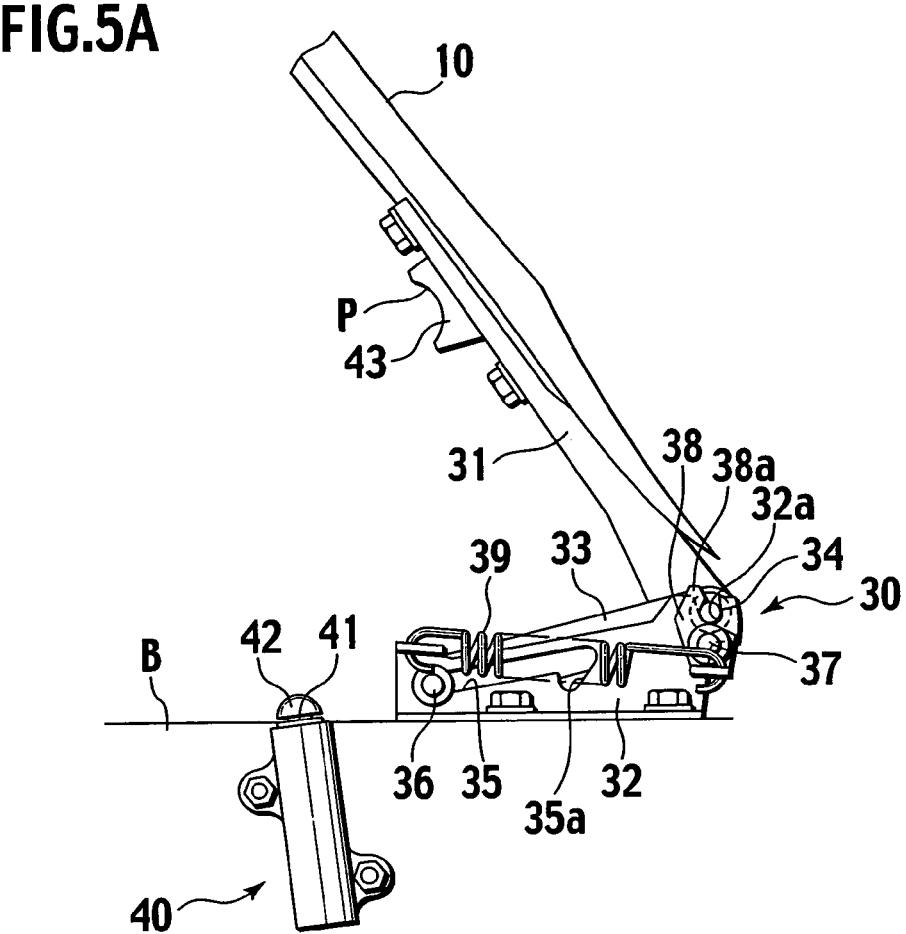
FIG. 5A is an enlarged side view of the hood hinge of the embodiment, showing a normal opening state of the hood

In the normal state (natural condition) of the hood hinge 30, since the lock claw 38a closes the engaging part 32a, the pivot pin 34 is rotatable in the engaging part 32a. Thus, after the locking of the hood lock 20 is cancelled to open the hood body 10, an operator's lifting up the front end of the hood body 10 allows the hood body 10 to be rotated upwardly about the engaging part 32a as a rotating center, as shown in FIG. 5A.

Figure 5B:
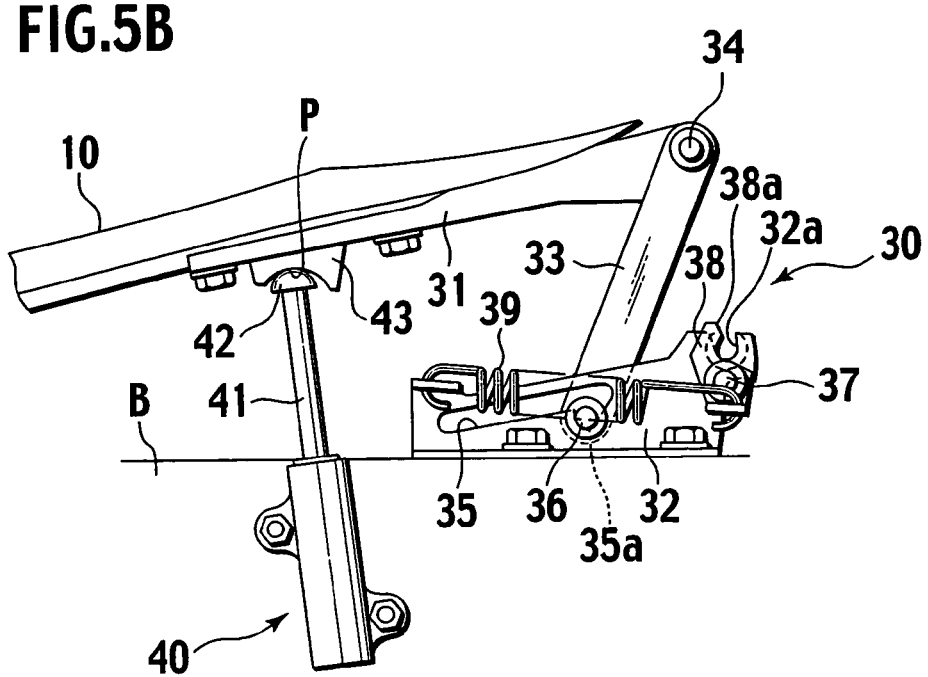
FIG. 5B is an enlarged side view of the hood hinge of the embodiment, showing a flip-up state of the hood.

Meanwhile, if the vehicle has a front collision with an object (not shown), the actuator 40 makes the push rod 41 project upwardly, as shown in FIG. 5B. With the projection of the push rod 41, a flip-up force is applied on the receiving piece 43 (i.e. the working point P) fixed on the backside of the hood body 10, so that the hood-side link member 31 is urged upwardly.

Then, the pivot pin 34 is subjected to an upward force that also acts on the lock claw 38a to its withdrawal direction. Consequently, the lock claw 38 rotates in a counter-clockwise direction of FIG. 5B against the urging force of the spring 38. The rotation of the lock claw 38 allows the pivot pin 34 to be disengaged from the engaging part 32a upwardly, so that the rear portion of the hood body 10 is lifted up as shown in FIG. 6.

With the lifting up of the rear portion of the hood body 10, the posture of the intermediate link member 33 is changed from its substantially-horizontal state (FIG. 5A) to the upstanding state (FIG. 5B) while the guide pin 36 is moving backwardly along the slide hole 35. Finally, the guide pin 36 is engaged in the retaining part 35a. At this time, the intermediate link member 35 acts to prop the hood body 10 while keeping it in the flipped condition.

According to the embodiment of the invention, as shown in FIG. 1, the hood body 10 is provided, on its underside, with a pair of wires 50. Each of the wires 50 is arranged so as to connect a substantial center of the inner surface of the hood body 10 (i.e. a hood connecting point K) with the hinge center C of the hood hinge 30, in detail, a peripheral part of the engaging part 32a of the body-side link member 32. Due to the provision of the hood hinges 30 on both sides of the hood body 10, the wires 50 in pairs are arranged in a substantial-V shaped manner on the backside of the hood body 10, as shown in FIGS. 1 and 2.

As for an effective distance between the hood connecting point K and the hinge center C on the vehicle-body side, it is noted that there exists a difference between the closed state of the hood body 10 (shown with chain double-dashed lines of FIG. 6) and the "flip-up" state (shown with solid lines of the same figure) since the rear end of the hood body 10 is raised with a distance h. More in detail, the effective distance between the point K and the hinge center C in the latter state is larger than that in the former state.

In this view, when the hood body 10 is in the closed state, there is produced a slack 50a for each wire 50, as shown in FIG. 2.

In order to assemble (wiring) the wires 50 between the hood body 10 and the vehicle body, it is firstly carried out to raise the hood body 10 as shown in FIG. 5B. Then, while straining each wire 50 with no slack, it is carried out to connect both ends of the wire 50 with the hood connecting point K and the hinge center C respectively. After wiring the wire 50 in the above way, the pivot pin 34 of each hood hinge 30 is engaged in the engaging part 32a of the body-side link member 32 (see FIG. 3), thereby producing the slack 50 with an appropriate slacking.

Figure 7:
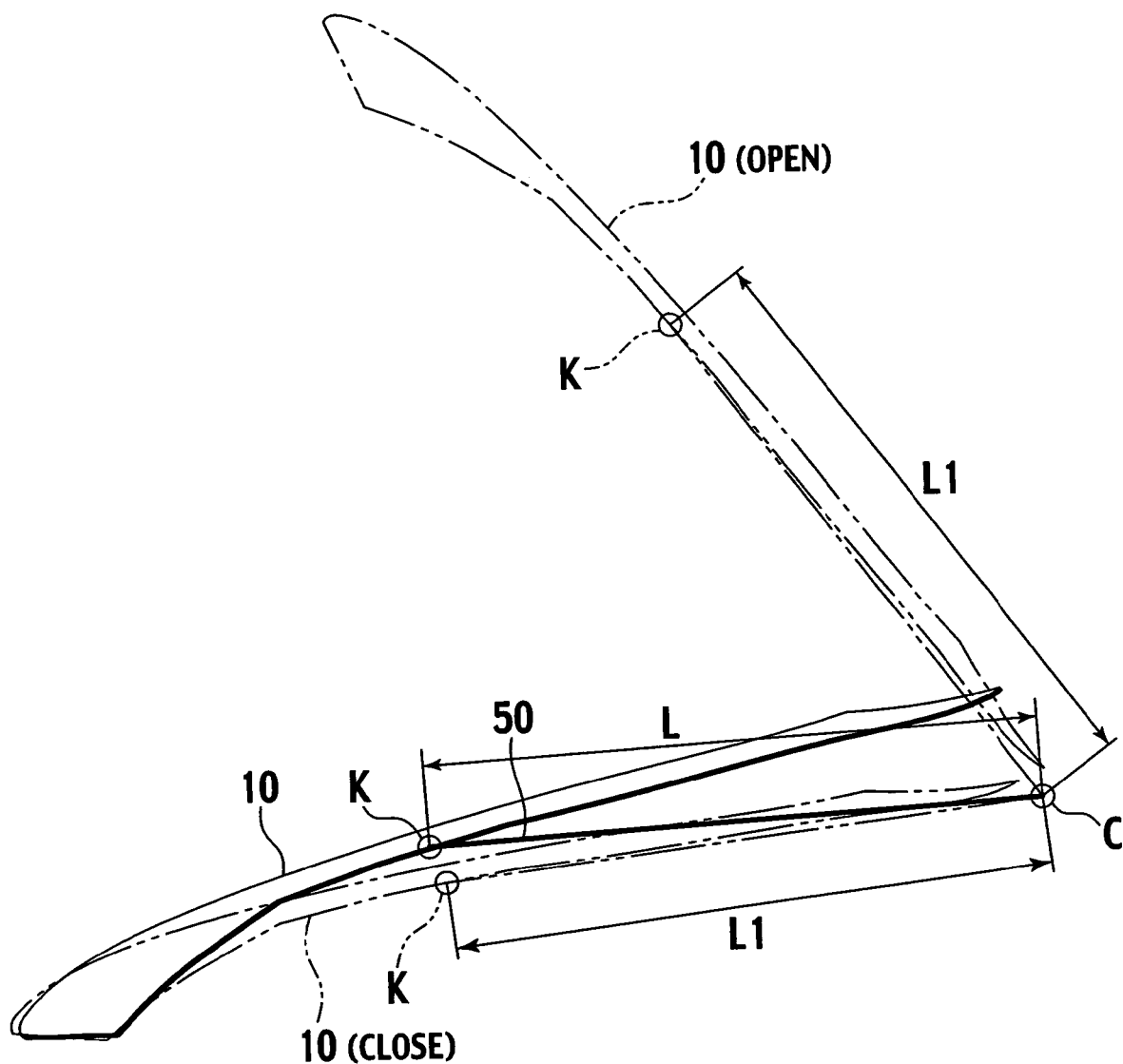
FIG. 7 is a view explaining the behavior of the hood of the embodiment including its flip-up state and the normal opening state.

In the normal (closing and opening) operation of the hood body 10 while engaging the pivot pin 34 in the engaging part 32a, as shown in FIG. 7, an effective distance L1 between the hood connecting point K and the hinge center C does not change between the opened state and the closed state of the hood body 10 (both shown with chain double-dashed lines of FIG. 7). Also noted the distance L1 is less than a distance L between the hood connecting point K and the hinge center C under condition that the rear portion of the hood body 10 is raised.

Figure 8A:
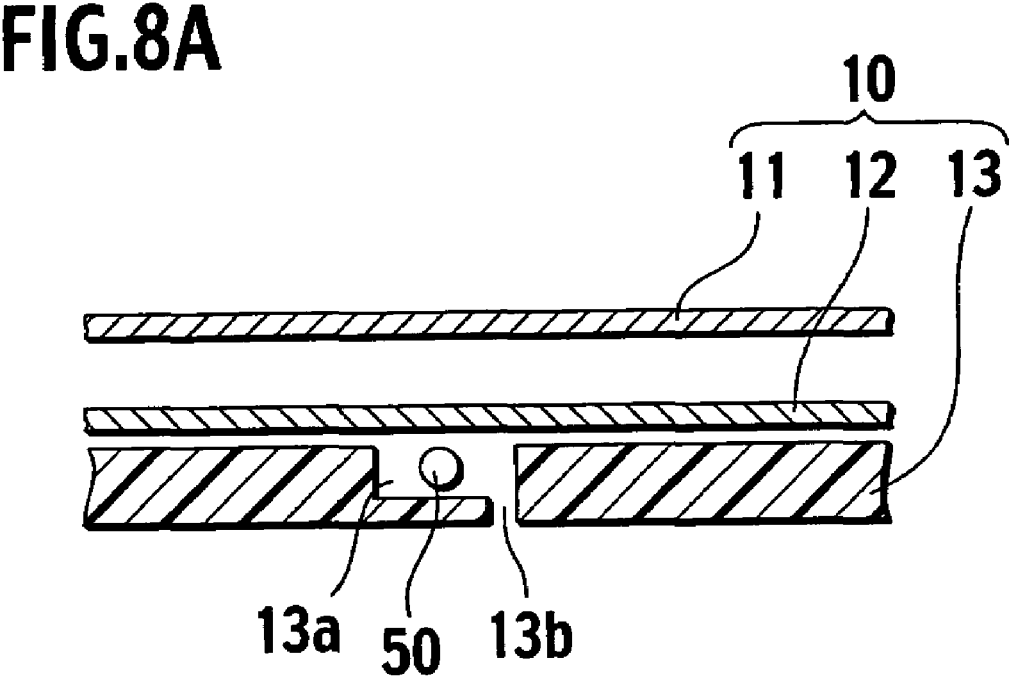
FIGS. 8A and 8B are enlarged sectional views of a substantial part of the hood taken along a line 8-8 of FIG. 1, showing a wire in its normal state in FIG. 8A and the wire in its activated state in FIG. 8B.

As shown in FIG. 8A, the hood body 10 is formed by an outer panel 11 and an inner panel 12 joined to the outer panel 11. Further, the hood body 10 is provided, inside the inner panel 12, with a hood insulator 13 for insulation against noise and heat.

The wires 50 are arranged on the backside of the hood insulator 13 close to the inner panel 12 and also adapted so as to scramble out of the hood body 10 when it is flipped up.

For this purpose, on the backside of the hood insulator 13, an accommodating groove 13a is formed along the wiring pattern of the wire 50, for accommodating them therein. On the bottom of the accommodating groove 13a, a successive slit 13b is formed so as to allow the scrambling of the wires 50.

Figure 8B:
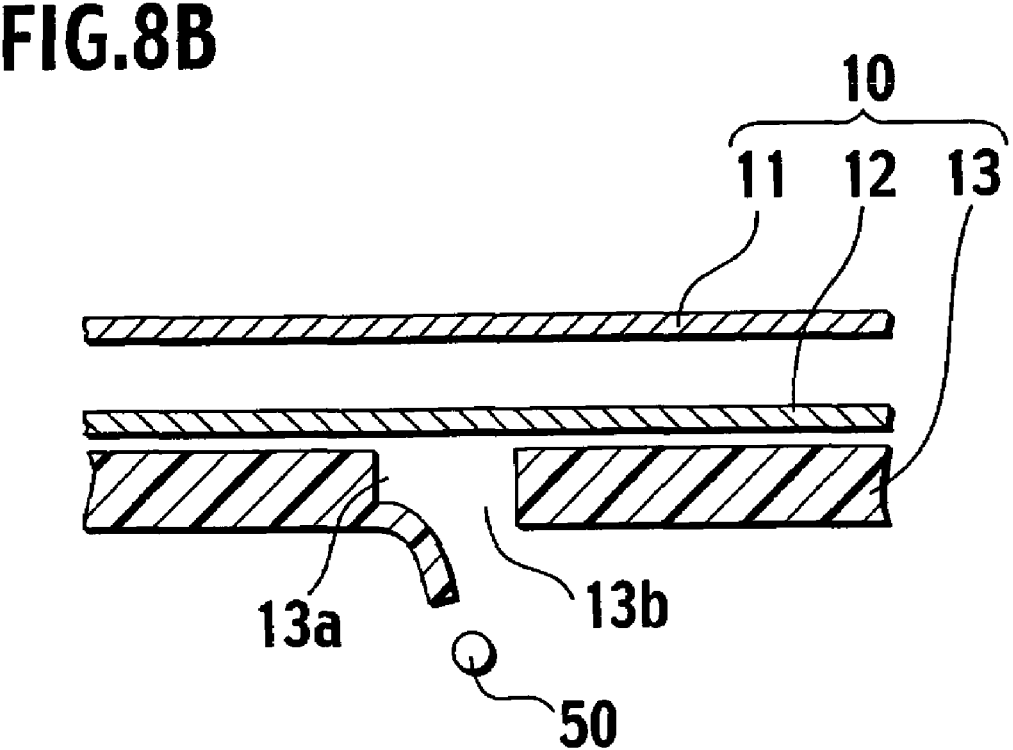

As shown in FIG. 1, the wires 50 are accommodated in the accommodating grooves 13a, together with their slacks 50a. With the flip-up operation of the hood body 10, if each of the wires 50 is strained, then it jumps out of the accommodating groove 13a through the slit 13b, as shown in FIG. 8B.

Additionally, as shown in FIG. 2, the hood body 10 is provided with reinforcing parts 60 that extend in a radial pattern from each working point P. In detail, these reinforcing parts 60 are provided by partially denting the inner panel 12 downwardly.

The above-mentioned flip-up type hood of the embodiment operates as follows. If the vehicle has a front collision with an object, then the actuator 40 is operated on detection of such a collision to strike up the rear portion of the hood body 10. Simultaneously, the wires 50 each connecting the hood connecting points K with the hinge centers C on both sides of the hood hinges 30 are together strained on the backside of the hood body 10 under its "flip-up" condition.

In this way, since the so-strained wires 50 operate so as to constrain the hood body 10 to the side of the vehicle body, it is possible to suppress the rear portion of the hood body 10 from being flipped up excessively. In other words, owing to the provision of the wires 50 between the hood body 10 and the vehicle body, it is possible to prevent an occurrence of flip-flop action of the hood body 10 when its rear portion is raised by the actuator 40.

Thus, according to the embodiment, it is possible to accomplish the hood body 10 in its stationary state at the stage of completing the designated "flip-up" operation. It means that there can be ensured a sufficient space defined between the hood body 10 and rigid members, such as an engine, under the hood body 10. In this way, it is possible to absorb impact energy on the object by the hood body 10 effectively.

According to the embodiment, since the wires 50 are arranged on the backside of the hood insulator 13 inside the hood, it is possible to prevent the wires 50 from being exposed to the outside of the hood body 10 in the normal state. Further, since the hood insulator 13 acts to restrain the movement of the wires 50 in the normal state, it is possible to prevent the quality of the hood from being deteriorated with respect to its exterior appearance and vibration isolating performance.

Additionally, owing to the radial arrangement of the reinforcing parts 60 from the working points P of the flip-up forces of the actuators 40, the rigidity of the hood body 10 can be improved against the flip-up forces of the actuators 40. Further, it is possible to enhance the restrictive measures against the flip-flop action of the hood body 10 furthermore.

Finally, it will be understood by those skilled in the art that the foregoing descriptions are nothing but one embodiment of the disclosed flip-type hood and therefore, various changes and modifications may be made within the scope of claims. For example, without being limited to the shown position of the hood connecting point K only, it may be established in any optional position on the hood body 10. Further, although the shown hood body 10 is provided with a pair of wires 50 in a V-shaped manner, the number and arrangement may be modified.

Japanese Patent Application No. 2004-37030 is incorporated herein by reference in its entirety.

What is claimed is:

1. A flip-up type hood for a vehicle, comprising:
a vehicle body forming the vehicle;
a hood body pivotally supported by the vehicle body through a hood hinge that is attached to a rear end of the hood body in a fore-and-aft direction of the vehicle;
an actuator provided in the vehicle body to apply a flip-up force on a rear portion of the hood body thereby flipping up the rear portion of the hood body apart from the vehicle body; and
a wire for connecting a central part of the inner surface of the hood body with a hinge center of the hood hinge, wherein a length of the wire is established so as to allow the wire to be strained on condition that the hood body is flipped up.

2. The flip-up type hood of claim 1, wherein
the hood hinge includes a hood-side link member attached to the hood body and a body-side link member attached to the vehicle body and associated with the hood-side link member,
the wire has its one end connected to the body-side link member, and
the hood body has a hood insulator that accommodates the wire therein so as to allow a wire's projecting out of the hood insulator when the hood body is flipped up by the actuator.

3. The flip-up type hood of claim 1, wherein the hood body is provided with a plurality of reinforcing parts extending in a radial direction from a working point of the flip-up force on the hood body.

4. The flip-up type hood of claim 3, wherein
the hood body includes an inner panel, an outer panel jointed to the inner panel and a hood insulator attached to the inner panel and formed to accommodate the wire therein so as to allow a wire's projecting out of the hood insulator when the hood body is flipped up by the actuator, and
the reinforcing parts are formed on the inner panel.

5. The flip-up type hood of claim 4, wherein
the hood insulator has a groove formed to accommodate the wire therein and a slit formed on a bottom of the groove to project the wire out of the hood insulator.

6. A flip-up type hood for a vehicle, comprising:
a vehicle body forming the vehicle;
a hood body pivotally supported by the vehicle body through a pair of hood hinges that are arranged on both sides of a rear end of the hood body in a fore-and-aft direction of the vehicle;
a pair of actuators provided in the vehicle body to apply flip-up forces on respective rear portions of the hood body thereby flipping up the rear portions of the hood body apart from the vehicle body; and
a pair of wires for connecting a central part of the hood body with a hinge center of each hinge, wherein respective lengths of the wires are established so as to allow the wires to be strained on condition that the hood body is flipped up.

7. The flip-up type hood of claim 6 wherein the wires are arranged in a substantial V-shaped manner on the backside of the hood body.

8. A flip-up type hood for a vehicle, comprising:
a vehicle body forming the vehicle;
a hood body pivotally supported by the vehicle body through a hood hinge that is attached to a rear end of the hood body in a fore-and-aft direction of the vehicle;
actuating means for applying a flip-up force on a rear portion of the hood body thereby flipping up the rear portion of the hood body apart from the vehicle body; and
wire means for connecting a central part of the hood body with a hinge center of the hood hinge, wherein a length of the wire means is established so as to allow the wire means to be strained on condition that the hood body is flipped up.

* * * * *